(12) United States Patent
Gleason et al.

(10) Patent No.: US 6,782,174 B1
(45) Date of Patent: Aug. 24, 2004

(54) METHOD OF REPAIRING A SLOPE-MATCHED CABLE SYSTEM AND REPLACEMENT CABLE PORTION FOR USE THEREIN

(75) Inventors: Robert F. Gleason, Freehold, NJ (US); Robert L. Lynch, Colts Neck, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 10/364,230

(22) Filed: Feb. 11, 2003

(51) Int. Cl.[7] ................................................. G02B 6/02

(52) U.S. Cl. ......................... 385/123; 398/81; 398/178

(58) Field of Search ................................ 385/123–128; 398/81, 82, 178

(56) References Cited

U.S. PATENT DOCUMENTS

| | | | |
|---|---|---|---|
| 5,894,537 | A | 4/1999 | Berkey et al. |
| 6,038,356 | A | 3/2000 | Kerfoot, III et al. |
| 6,052,219 | A | 4/2000 | Kidorf et al. |
| 6,137,604 | A | 10/2000 | Bergano |
| 6,188,823 | B1 | 2/2001 | Ma |
| 6,301,419 | B1 | 10/2001 | Tsukitani et al. |
| 6,311,002 | B1 | 10/2001 | Evangelides et al. |
| 6,317,238 | B1 | 11/2001 | Bergano et al. |
| 6,320,884 | B1 | 11/2001 | Kerfoot, III et al. |
| 6,396,624 | B1 | 5/2002 | Nissov et al. |
| 6,414,786 | B1 | 7/2002 | Foursa |
| 6,421,484 | B2 | 7/2002 | Tanaka et al. |

(List continued on next page.)

FOREIGN PATENT DOCUMENTS

WO    WO/02056069 A2    7/2002

OTHER PUBLICATIONS

H. Masuda, K.–I. Suzuki, S. Kawai and K. Aida, Ultra–wideband optical amplification with 3dB bandwidth of 65 nm using a gain–equalised two–stage erbium–doped fibre amplifier and Raman amplification, Electronics Letters, 24th Apr. 1997, vol. 33, No. 9.

S.N. Knudsen, D.W. Peckham, M.O. Pedersen, B. Zhu, A.F. Judy and L.E. Nelson, New Dispersion–Slope Managed Fiber Pairs for Ultra Long Haul Transmission Systems, National Fiber Optic Engineers Conference, 2001, 2001 Technical Proceedings, 1599–1607.

*Primary Examiner*—Hemang Sanghavi
(74) *Attorney, Agent, or Firm*—Grossman, Tucker, Perreault & Pfleger, PLLC

(57) ABSTRACT

A method of repairing a slope-matched cable system that leaves the net chromatic dispersion of the system nominally unchanged comprises removing a portion of the slope-matched cable system that is faulted, either the cable or a repeater, and constructing a replacement cable portion from two N-P cable lengths having negative dispersion fibers and positive dispersion fibers and a P cable length having positive dispersion fibers. The N-P cable lengths are coupled on each side of the P cable length and the replacement cable portion is connected to the slope-matched cable where the faulted cable was removed. The method also accounts for the extra cable that necessarily has to be added during the repair and for the replacement of a faulted repeater. A cable repair can be made in a regular cable section or in a compensation cable section, in which case the replacement cable portion can also include a repair repeater with LBOs to leave the gain shape of the transmission spectrum nominally unchanged and allows for replacement of a gain equalizer if one was removed during the repair. Similarly, when a faulted repeater is removed the replacement portion can include a replacement repeater, as well as a repair repeater, to leave the gain shape of the transmission spectrum nominally unchanged.

29 Claims, 12 Drawing Sheets

U.S. PATENT DOCUMENTS

| | | |
|---|---|---|
| 6,424,455 B1 | 7/2002 | Dmitri |
| 6,477,306 B2 | 11/2002 | Kato et al. |
| 2002/0041415 A1 * | 4/2002 | Tanaka et al. .............. 359/179 |
| 2002/0048439 A1 | 4/2002 | Tsukitani et al. |
| 2002/0181076 A1 | 12/2002 | Bickham et al. |
| 2004/0008957 A1 * | 1/2004 | Sakuyama .................. 385/123 |

* cited by examiner

METHOD OF REPAIRING A SLOPE-MATCHED CABLE SYSTEM AND REPLACEMENT CABLE PORTION FOR USE THEREIN

TECHNICAL FIELD

The present invention relates to the repair of fiber optic cable systems and more particularly, the repair of an undersea cable system that uses dispersion slope-matched cable.

BACKGROUND INFORMATION

A fiber optic cable system is made up of cable containing optical fibers and repeaters containing optical amplifiers located periodically along the cable length. A fiber optic cable system can also include gain equalizers located periodically along the cable length. One important design parameter of such a system is chromatic dispersion, which relates to the velocity with which light at different wavelengths travels along the optical fibers. Dispersion as a function of system length needs to be managed if transmission performance of the system is to be optimized. One management method is to use sloped-matched cable, wherein the net end-to-end dispersion of each fiber path in the system is nominally constant across the transmission band and does not change with temperature.

In a typical Dense Wavelength Division Multiplex (DWDM) undersea slope-matched cable system, the "regular" or "transmission" cable sections ("cable section" refers to cable between adjacent repeaters) is made up of N-type and P-type fibers. These N-type and P-type fibers have large negative and positive dispersion rates (vs. distance), respectively, but in such proportion as to achieve a nominally constant net dispersion (e.g., a rate of about −3 ps/nm-km$^2$). The dispersion match preferably holds closely as a function of both wavelength and temperature.

Referring to FIG. 1, one fiber-pair makeup in a regular cable section 10 is shown with the thicker line representing the P-type fiber 12 and the thinner line representing the N-type fiber 14. Although one fiber pair is shown, an actual section typically contains multiple fiber pairs. In FIG. 1, optical signals are transmitted left to right in the upper fiber path and right to left in the lower fiber path. The slope-matched cable section 10 includes a middle portion 16 containing all-P-type fibers 12 and two end portions 18a, 18b containing both P-type and N-type fibers 12, 14. One example of the N-type fiber is available from Lucent under the designation IDFX2. One example of the P-type fiber is available from Lucent under the designation SLA. In the regular cable sections, the P-type fibers 12 and N-type fibers 14 are typically spliced together at the fiber factory using bridge fibers to minimize the net splice loss.

In addition to regular cable sections, compensation cable sections (not shown) containing all-P-type fibers can be used to manage the dispersion characteristic of the system appropriately. In one example of a slope-matched cable system, two or three "compensation" cable sections in tandem are used every 450–500 km along the system length. FIG. 2 shows a dispersion map for an ideal double-compensating block length (using regular and compensation cable sections).

System gain equalization, separate from that which might be used in the repeater, in the form of, for example, Gain Equalizer Joints (GEJs), which correct for gain tilt, and Shape Compensating Units (SCUs), which correct for non-flat gain shape, can be placed in their own housings and be located in the compensation cable sections. To properly manage system dispersion, some compensation cable sections can be significantly shorter than regular cable sections and contain mid-section Loss Buildouts (LBOs). The LBOs are deliberately inserted amounts of optical attenuation in splice boxes to build out the loss to the cable section design value. A splice box is the main apparatus used to house fiber splices in a cable-to-cable joint.

Cable systems sometimes become faulted and must be repaired. Faults can occur in a portion of the cable or in a repeater connected to the cable. Referring to FIGS. 3–6, a repair operation to replace the faulted portion of an undersea cable 20 is described in greater detail. A typical undersea repair operation starts by cutting the cable 20 and retrieving what is expected to be the "good" end of the cable 20. Generally, the cable is engaged at a location B1 about a water depth D away from the cut so that there is equal weight on both sides during recovery (see FIG. 4). As a result, at least one water depth length D of the original cable section is removed. More cable (e.g., up to a kilometer) can be removed because of water ingress into the core cable structure from the cut end. After this cable is cleared, the end B1 of the cable 20 is sealed and it is buoyed off (see FIG. 5). The other cable end A2 is then retrieved and another water depth D or more length of the original cable 20 is removed. The fault is preferably in one of the lengths of cable 20 that was removed. If not, more cable is recovered until the cable is cut beyond the fault. If a faulty repeater is to be replaced, cable is recovered until it is onboard the ship, where it is cut out and replaced with a spare repeater.

Spare cable is then joined to the "good" end of the cable 20. The length of the spare cable is preferably enough to replace the original cable that was removed plus an additional length of typically 2 to 2.5 times the depth of water so that the final joint can be made before the cable bight is overboarded (see FIG. 6). For some existing broadband systems, it is prudent to insert an additional repeater, called a repair repeater, in the replacement cable to avoid a change in transmission gain shape (i.e., gain-tilt) that would occur because of the added loss resulting from the repair. Based upon the repair operation discussed above, the minimum amount of spare cable used during the repair (i.e., the replacement portion) is often 4.5 times the water depth at the repair site. The replacement portion might even be longer if more cable is removed due to water ingress into the otherwise good cable or not initially finding the fault in the recovered cable, or when a faulty repeater is retrieved.

Repairing slope-matched cable systems can present difficulties because the net end-to-end system dispersion following a repair should preferably remain unchanged. Even if the replacement section uses the same cable type that was removed, the added cable length will significantly unbalance the dispersion in both transmission directions.

Accordingly, a method of repairing a slope-matched cable system is needed that will allow the net end-to-end system dispersion following the repair to remain nominally unchanged in both transmission directions, even when a repair is made in a compensation cable section. A method of repairing a slope-matched cable system is also preferable such that it nominally leaves unchanged the gain tilt across the transmission spectrum.

SUMMARY

To address the needs mentioned above, a slope-matched cable system is repaired using a replacement cable portion that leaves the net dispersion in the cable system nominally unchanged. In accordance with one aspect of the present invention, a method is used to repair a slope-matched cable system including at least one N-type fiber having a negative dispersion rate and at least one P-type fiber having a positive dispersion rate. The method comprises removing a faulted portion of the slope-matched cable system. First and second N-P cable lengths are provided from spare N-P cable including at least one N-type fiber and at least one P-type fiber. At least one all-P cable length is provided from spare P cable including at least first and second P-type fibers. A replacement cable portion is constructed from the N-P cable lengths and the all-P cable length, wherein the N-P cable lengths are connected to each side of the P cable length. During the repair, the replacement cable portion is connected between ends of the originally installed slope-matched cable where the faulted portion was removed. The method can also include connecting a repair repeater to one end of the replacement cable portion and/or connecting a replacement gain equalizer to the replacement cable portion when repairing a cable fault. The method includes connecting a replacement repeater to one end of the replacement cable portion and a repair repeater to the other end when repairing a repeater fault.

According to another aspect of the present invention, a replacement cable portion comprises first and second N-P cable lengths including half N-type fibers and half P-type fibers and at least one P cable length including all-P-type fibers. The N-type fibers have a negative dispersion rate and the P-type fibers have a positive dispersion rate. A first splice box connects the first N-P cable length and the P cable length. The N-type fibers in the first N-P cable length are spliced to a first half of the P-type fibers in the P cable length. The P-type fibers in the first N-P cable length are spliced to a second half of the P-type fibers in the P cable length. A second splice box connects the first N-P cable length and the P cable length. The N-type fibers in the first N-P cable length are spliced to the first half of the P-type fibers in the P cable length. The P-type fibers in the first N-P cable length are spliced to the second half of the P-type fibers in the P cable length. The replacement cable portion is preferably designed such that the net dispersion and gain shape of each fiber path in the system remains nominally unchanged when repaired with the replacement cable portion. Gain shape is preferably maintained by including, in the replacement portion, a repair repeater (and a replacement repeater when needed) with suitable Loss Buildouts (LBOs).

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
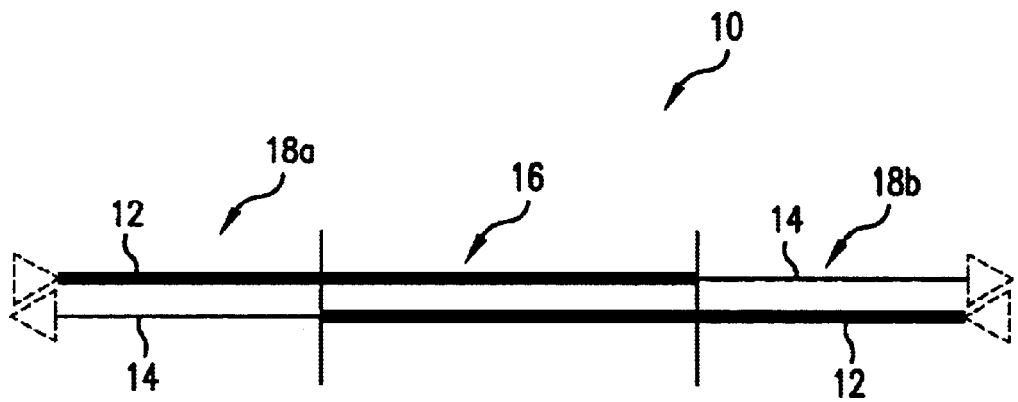
FIG. 1 is a schematic diagram of one fiber pair in a regular cable section in a slope-matched cable system.
Figure 2:
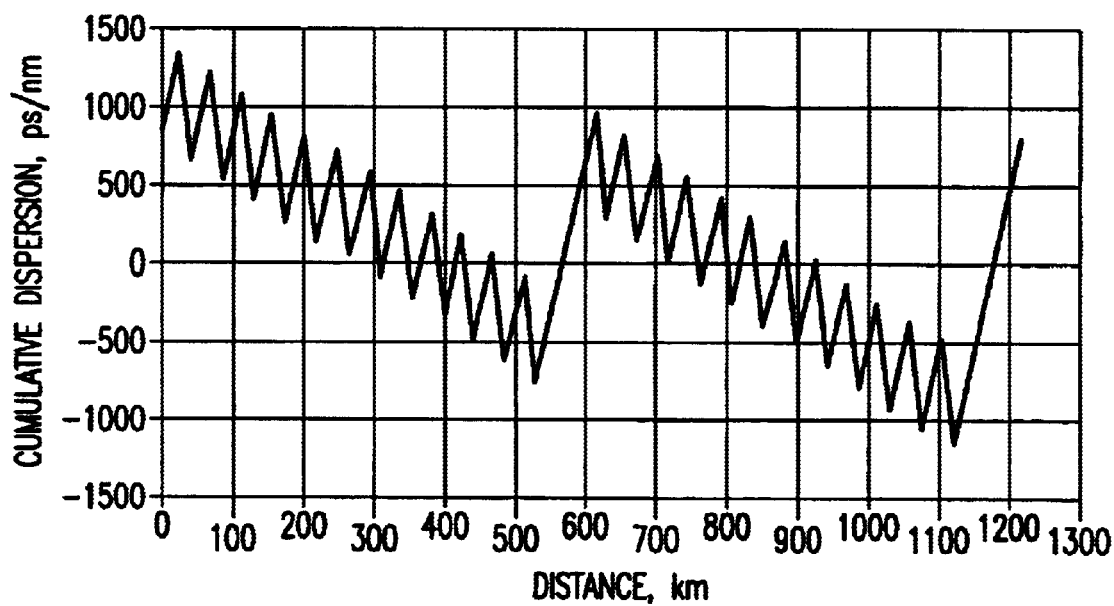
FIG. 2 is an example of a nominal slope-matched dispersion map (dispersion vs. cable length) for a double-compensating block with no cable repairs.
Figure 3:
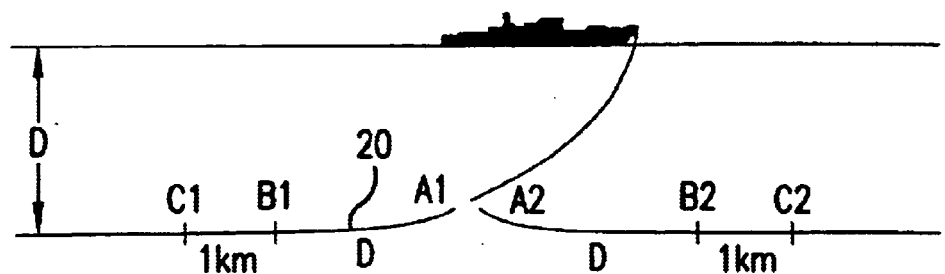
FIGS. 3–6 illustrate a typical undersea cable repair operation.
Figure 4:
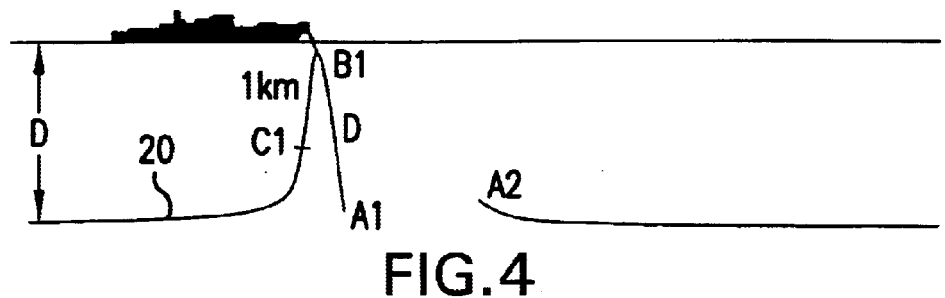
Figure 5:
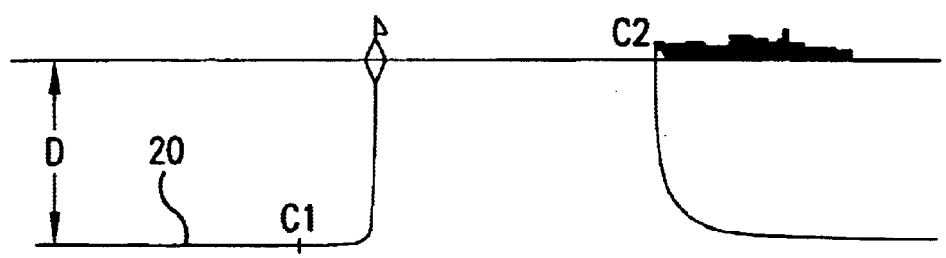
Figure 6:
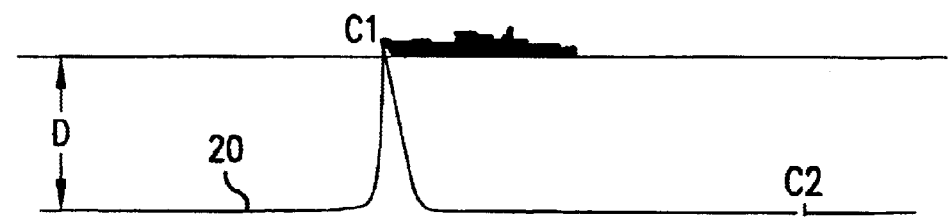
Figure 7:
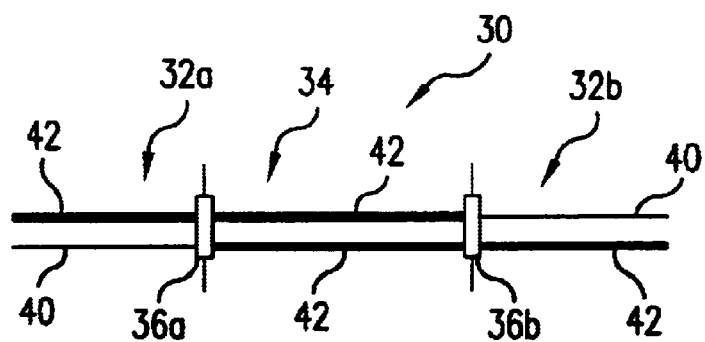
FIG. 7 is a schematic diagram of a replacement cable portion, according to one embodiment of the present invention.

Referring to FIG. 7, one embodiment of a replacement cable portion 30 used in the repair of a slope-matched cable system is shown. As described in greater detail below, the replacement cable portion 30 can be used to repair a regular cable section (containing both N-type and P-type fibers) or a compensation cable section (containing all-P-type fibers). The replacement cable portion 30 can also be used with or without a repair repeater, a replacement repeater, gain equalizers such as Gain Equalizer Joints (GEJs) and Shape Compensating Units (SCUs), or other components. Although the exemplary method is for the repair of a slope-matched cable system in an undersea environment, the method and the replacement cable portion 30 can also be used to repair a slope-matched cable system in other environments where a significant amount of extra cable must be added in a repair.

In general, the method of repairing a slope-matched cable comprises the steps of removing a faulted portion of the slope-matched cable system, constructing a replacement cable portion, and connecting the replacement cable portion to the slope-matched cable system where the faulted portion was removed. The faulted portion of the cable system can include a fault in the cable or a fault in a repeater. The replacement cable portion is constructed from spare N-P cable and spare P cable and might also include a repair repeater, a replacement repeater, LBOs, and/or a replacement equalizer unit.

The replacement cable portion 30 includes first and second N-P cable lengths 32a, 32b connected at each end of a P cable length 34. The N-P cable lengths 32a, 32b are preferably connected to the P cable length 34 using cable joints containing splice boxes 36a, 36b. The replacement cable portion 30 can also be connected between the original cable sections (not shown) using splice boxes (not shown) at each end of the N-P cable lengths 32a, 32b. Cable jointing and fiber splicing are known to those skilled in the art, and existing joints and splice boxes can be used.

The N-P cable lengths 32a, 32b are constructed from one type of spare cable containing half N-type fibers 40 having a negative dispersion rate and half P-type fibers 42 having a positive dispersion rate. The all-P cable length 34 is constructed from another type of spare cable containing all-P-type fibers 42. One example of the N-type fiber 40 has a negative dispersion rate of nominally −40 ps/nm-km, such as the type available from Lucent under the designation IDFX2. One example of the P-type fiber 42 has a positive dispersion rate of nominally 20 ps/nm-km, such as the type available from Lucent under the designation SLA. Although FIG. 7 shows only one pair of fibers in each of the cable lengths 32a, 32b, 34, a typical cable will have multiple fiber pairs. Also, other dispersion rates are contemplated.

Figure 8:
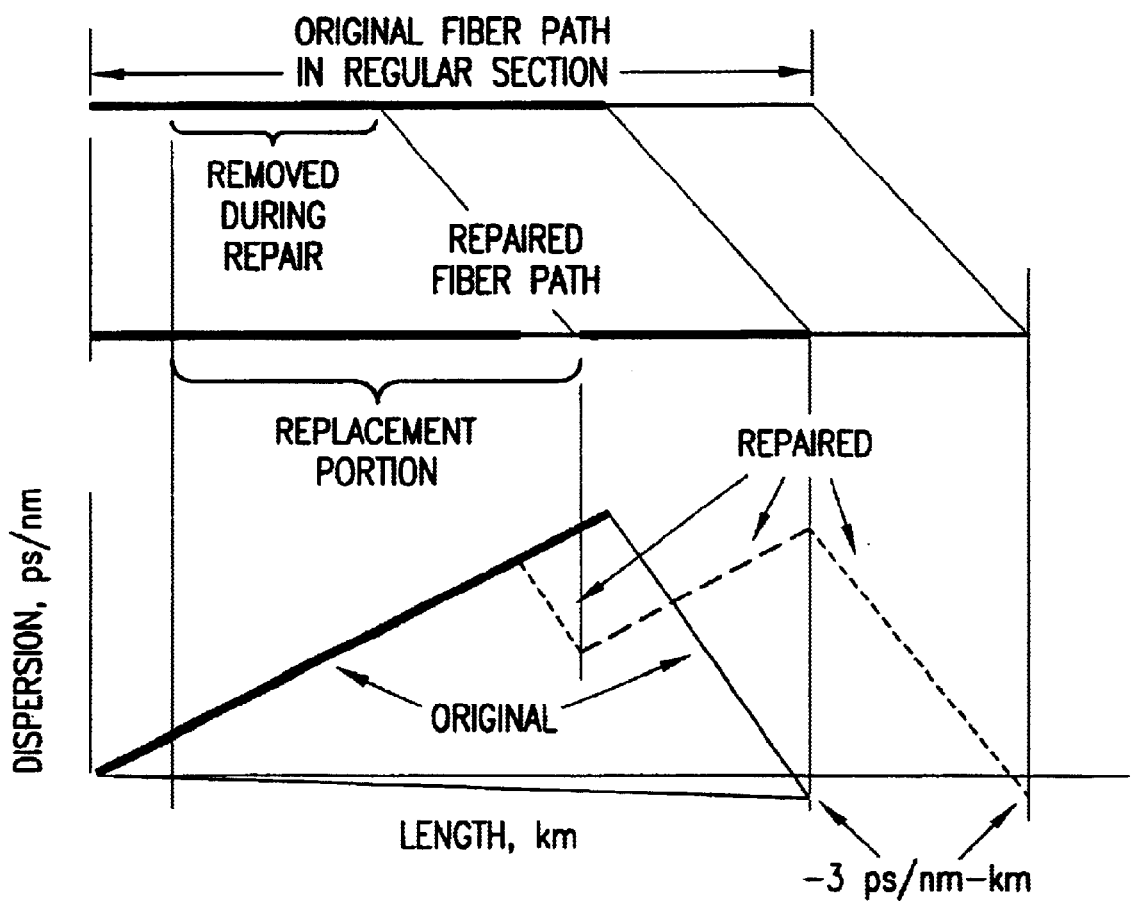
FIG. 8 is a graph illustrating a net-zero dispersion change in one fiber path of one embodiment of a cable section repaired according to the present invention.

The two types of spare cable (i.e., the N-P cable lengths 32a, 32b and the P cable length 34) are combined in proportions that will leave the net nominal dispersion after the repair substantially unchanged, even when the repair is made in a compensation cable section. FIG. 8 shows the dispersion in an original fiber path of a regular cable section compared to the dispersion in the repaired fiber path of the repaired regular cable section. When the replacement cable portion 30 is used to repair a cable in a slope-matched system, the net dispersion of the repaired fiber path can be made nominally equal to that of the original fiber path.

The lengths of the spare cables 32a, 32b, 34 used to construct the replacement cable portion 30 are calculated such that the dispersion of the overall slope-matched cable system is nominally unchanged when the repair is complete. One method of calculating these lengths is described in greater detail below. For purposes of the following calculation, dispersion [in ps/nm] is denoted using A and dispersion rate vs. distance [in ps/(nm-km)] is denoted by using D. The term "dispersion" may be used herein for both concepts. The terms "Eastbound" and "Westbound" are used herein to differentiate the two directions of transmission and correspondingly the two arrangements of fiber found in a regular cable section. Eastbound and Westbound, as used herein, do not necessarily correspond to the compass directions.

During a repair, the dispersion taken out of the system as a result of removing some of the original cable section needs to be replaced and cable length must be added. After the original cable has been cut and the portion of the cable with the fault has been removed, the amount and type of original cable removed from the slope-matched cable system is determined. The lengths of the Eastbound-transmitting fibers that have been removed are defined as $X_{pe}$ of P-type and $X_{ne}$ of N-type. Similarly, the lengths of Westbound-transmitting fibers that have been removed are defined as $X_{pw}$ of P-type and $X_{nw}$ of N-type. These fibers are all in the same cable, so $$X_{pe}+X_{ne}=X_{pw}+X_{nw} \qquad \text{Eq. 1}$$

The length of extra cable added during the repair (in addition to replacing $X_{pc}+X_{ne}$) is donated as δ.

In the Eastbound direction, the amount of dispersion removed from the system, which is the amount that should preferably be replaced, is $$\Delta_{re}=D_p X_{pe}+D_n X_{ne} \qquad \text{Eq. 2}$$

where $D_p$=dispersion rate of P-type fiber, and
$D_n$=dispersion rate of N-type fiber.

Figure 9:
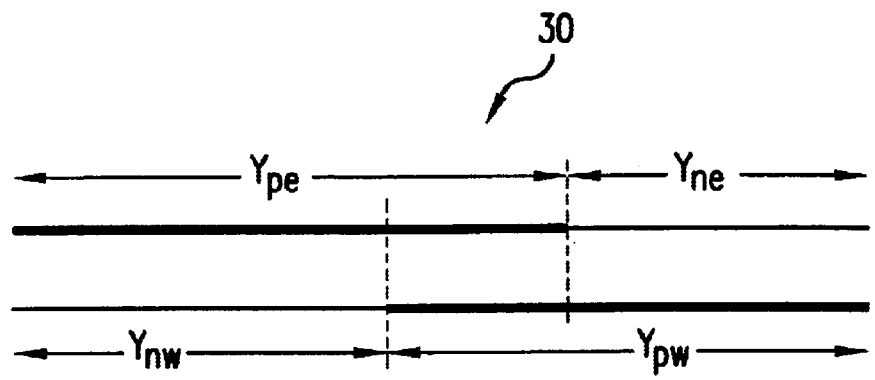
FIG. 9 is a schematic diagram illustrating the length of the N-type and P-type fibers used in a replacement cable portion, according to one embodiment of the present invention.

Referring to FIG. 9, the general configuration of a fiber pair in the replacement cable portion 30 is shown with the P-type fibers represented by the thicker line and the N-type fibers represented by the thinner line. Let YpC be the length of P-type fiber in the Eastbound direction in the total length of the replacement cable portion 30. Then $$Y_{pe}D_p+(X_{pe}+X_{ne}+\delta-Y_{pe})D_n=\Delta_{re} \qquad \text{Eq. 3}$$

Combining Equations 2 and 3, $$Y_{pe} = X_{pe} - \left(\frac{D_n}{D_p - D_n}\right)\delta \qquad \text{Eq. 4}$$

The length of N-type fiber in the Eastbound direction is then $$Y_{ne} = X_{ne} + \left(\frac{D_p}{D_p - D_n}\right)\delta \qquad \text{Eq. 5}$$

If a similar analysis is carried out for the Westbound direction, the length of P-type fiber in the replacement cable portion 30 is $$Y_{pw} = X_{pw} - \left(\frac{D_p}{D_p - D_n}\right)\delta \qquad \text{Eq. 6}$$

and the length of N-type fiber is $$Y_{nw} = X_{nw} + \left(\frac{D_p}{D_p - D_n}\right)\delta \qquad \text{Eq. 7}$$

As discussed above, the replacement cable portion 30 includes three cable lengths 32a, 32b, 34 and four joints are used to complete the repair (see FIG. 7). Based on the above Equations, one of the N-P spare cable lengths 32a is $Y_{nw}$ long and the other of the N-P spare cable lengths 32b is $Y_{ne}$ long. The P spare cable 34 has a length of ($Y_{pe}-Y_{nw}$) which is also equal to ($Y_{pw}-Y_{ne}$).

Figure 10:
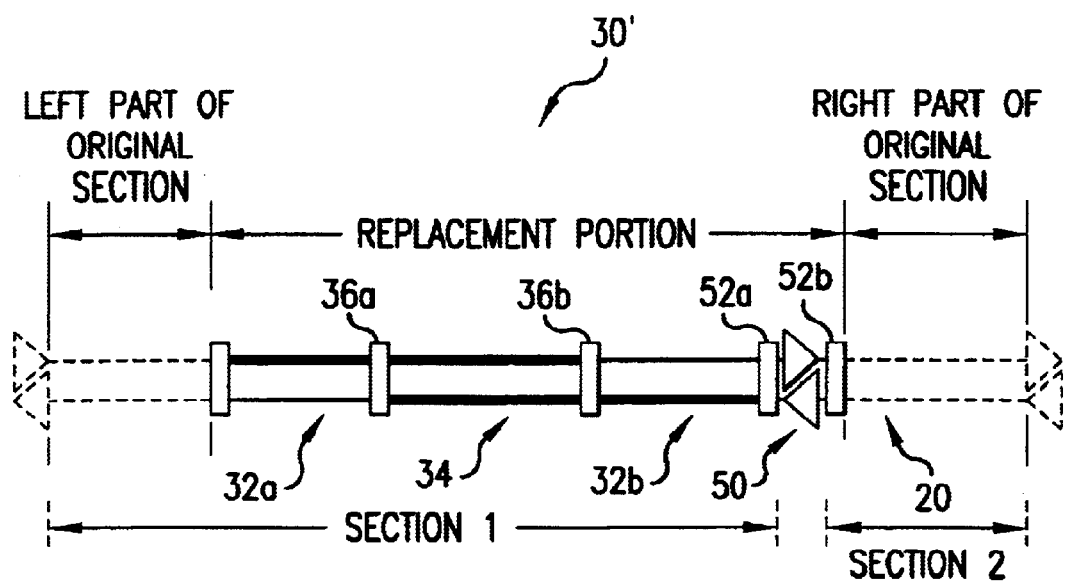
FIG. 10 is a schematic diagram of a replacement cable portion containing a repair repeater, according to another embodiment of the present invention.

Additional embodiments will now be described where like or similar elements are identified in the drawings with the same reference numerals. Another replacement cable portion 30', shown in FIG. 10, includes a repair reapeater 50 connected at one end of one of the N-P cable lengths 32b. The repair reapeater 50 is preferably used for deep-sea repairs in slope-matched cable systems to avoid large amounts of gain tilt that would otherwise be introduced, for example, as a result of adding five or more dB of extra cable and splice losses. Although optical amplifiers automatically compensate for added loss in a cable section by increasing the gain of adjacent repeaters, gain tilt is introduced when repeater input power is lowered (or raised) compared to the nominal system design value. This is particularly onerous for broader transmission bands. In a 26-nm bandwidth, for example, gain tilt can be over half a dB for every dB of extra loss and the extra loss added in a slope-matched cable repair can be over 5 dB for a typical 5-km repair depth. The added loss results from the added cable length (e.g., 2 to 2.5 water depths), the relatively high attenuation of N-type fibers, and the number of splices and high splice loss between some fiber types. The repair reapeater 50 might not be required for certain repairs, for example, if a large value of LBO, installed during system assembly, is removed during the repair.

The repair reapeater 50 is coupled between the N-P spare cable length 32b and the original cable 20 using splice boxes 52a, 52b. The addition of the repair reapeater 50 creates two cable sections where one cable section existed prior to the repair. Although the loss of the two new cable sections might not be able to be made equal to the nominal design loss for a cable section, the combined loss of the two new cable sections, for each fiber path, can preferably be made close to twice the nominal design loss of a single cable section. To achieve the desired design loss, the splice boxes preferably include Line Buildouts (LBOs) and the LBO values can be chosen to accomplish the desired nominal design loss while minimizing the difference between the loss in the two sections, thus insuring that end-to-end gain shape of the system transmission spectrum will remain nominally unchangead by the repair. One method of calculating the ideal LBO values is described in greater detail below.

For purposes of describing the methods of repair in greater detail, the "Left" side of the cable section corresponds to the remaining original cable section having lower loss (usually shorter length) after the ends are recovered and the fault is cleared. The "Right" side refers to the other half of the remaining original cable section. The "Eastbound" transmission direction is from Left to Right and the "Westbound" transmission direction is from Right to Left.

Net losses are calculated for the original section and the replacement portion, and ideal LBO values are calculated for placement on either side of the repair repeater. The ideal LBO values are calculated for each direction of transmission, Eastbound (i.e., Left to Right in the figure) and Westbound (i.e., Right to Left in the figure). The equations for calculating ideal LBO values also assume that no factory-installed LBOs are in the remaining portions of the original cable section being repaired. If LBOs have been factory installed and located in the original remaining Left and Right cable portions, they should preferably be included in the calculations.

The equations for calculating ideal LBO values depend on the repair scenario. Four repair scenarios are considered in a regular cable section having a fault, depending upon a combination of the location of the initial cable cut and how much original cable is removed from the two sides of the cut. Three additional repair scenarios are considered in a compensation cable section having a fault, depending on whether or not it contains a gain equalizer (e.g., GEJs or SCUs) and whether or not the gain equalizer is initially removed as part of the repair.

Figure 11:
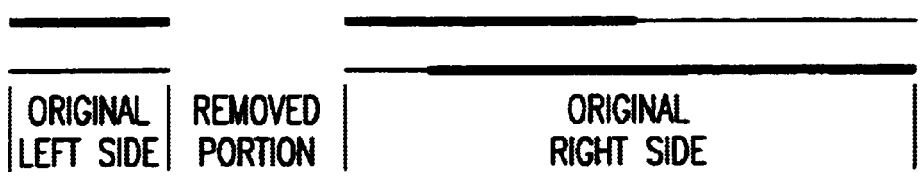
FIGS. 11–14 illustrate various repair scenarios of cable removal in a regular cable section.
Figure 12:
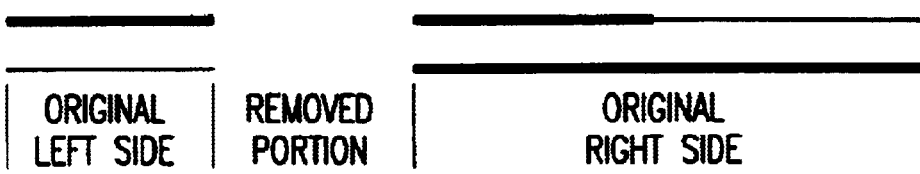
Figure 13:
Figure 14:

Referring to FIGS. 11–14, the four repair scenarios in a regular cable section are as follows: (1) all N-P cable repair (FIG. 11); (2) all-P cable repair (FIG. 12); (3) hybrid N-P and P cable repair (FIG. 13); and (4) removal of entire middle-P portion (FIG. 14). The loss calculations are not the same for these four repair scenarios because some splice losses vary among them.

Figure 15:
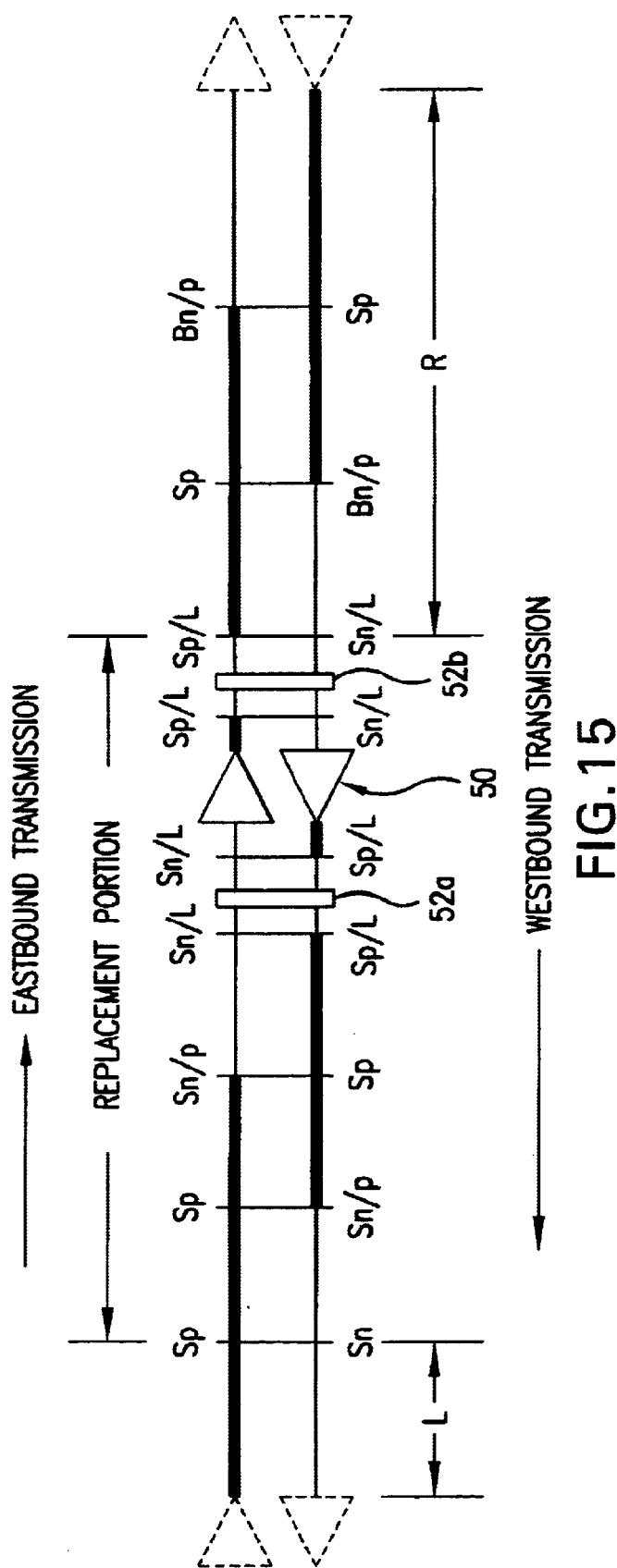
FIG. 15 is a schematic diagram of one embodiment of a repaired regular cable section with the repair in a portion having N-type and P-type fibers.

Referring to FIG. 15, the calculation of losses and ideal LBO values for the all N-P cable repair scenario is described in greater detail. FIG. 15 shows a completed all N-P repair including the splices associated with insertion of repair repeater splice boxes (with LBOs) 52a, 52b. In the exemplary embodiment, the LBOs are made using LMF fiber. L and R represent the remaining lengths (km) of the original cable section on the Left and Right side, respectively. Note that this is an all N-P repair because both of the joints from the original cable to the replacement portion (on the Left and Right) are all-N-P cable. The fiber splice losses (in dB) are identified as follows: $S_p$: P-to-P splice; $S_n$: N-to-N splice; $S_{n/p}$: N-P or P-N splice; $S_{P/L}$: P to LMF fiber, $S_{n/L}$: N to LMF fiber; and $B_{n/p}$ original fiber factory N-P splice made with a bridge fiber between them (splice loss value different than a direct shipboard N-P splice, $S_{n/p}$). Assuming no LBO losses but including the splice losses at the LBO ends, the repaired cable section losses are as follows $$\text{Eastbound:} [L_{pe}\alpha_p + Y_{pe}\alpha_p + Y_{ne}\alpha_n + (3S_p + S_{n/p} + 2S_{n/L} + 2S_{p/L} + B_{pn}) + R_{pe}\alpha_p + R_{ne}\alpha_n] \, dB \quad \text{Eq. 8}$$

$$\text{Westbound:} [L_{nw}\alpha_n + Y_{nw}\alpha_n + Y_{pw}\alpha_p + (S_n + S_{n/p} + 2S_p + 30 \, 2S_{p/L} + 2S_{n/L} + B_{pn}) R_{nw}\alpha_n R_{pw}\alpha_p] \, dB \quad \text{Eq. 9}$$

where $\alpha_p$ and $\alpha_n$ are the attenuation of P and N fibers in dB/km and $L_{pe}$, $L_{nw}$, $R_{pe}$, $R_{ne}$, $R_{nw}$ and $R_{pw}$ are the lengths (km) of the Left-Eastbound P fiber, Left-Westbound N fiber, Right-Eastbound P fiber, Right-Eastbound N-fiber, Right-Westbound N fiber and Right-Westbound P fiber paths, respectively.

Accounting for the LBO losses at the input and output of the repair repeater 50, the total LBO loss values to be inserted in each direction of transmission is equal to the losses calculated from Equations 8 and 9 subtracted from twice the nominal loss of a regular cable section, which is defined as B (the nominal bulk loss of a cable section). This nominal bulk loss of a cable section can vary from system to system and is 10.46 dB in one example. How this total LBO loss ($LBO_T$) should be distributed between the Left hand and Right hand LBOs in splice boxes 52a, 52b ($LBO_L$ and $LBO_R$) can be determined by minimizing the difference in loss between the new cable sections on either side of the repair repeater 50.

If $L_L$ and $L_R$ represent the loss of the two new sections, one to the Left and one to the Right of the repair repeater, then the ideal LBO values are as follows:

$$LBO_L = (B + L_L) \text{ dB, and} \quad \text{Eq. 10}$$

$$LBO_R = (B - L_R) \text{ dB.} \quad \text{Eq. 11}$$

In some repairs, the value of either equation 10 or 11 can be negative. When this happens, then whichever LBO loss calculates to be negative is set to 0, and the other LBO takes the value of $LBO_T$. This algorithm minimizes the difference in loss between the new cable sections on each side of the repair reapeater 50 and maintains the total loss of the two new sections equal to twice the nominal design loss of a cable section. This same algorithm applies to all the remaining repair scenarios for both regular and compensation sections, as described below.

For a hybrid repair (see FIG. 12), the losses of the repaired cable section (ignoring LBO losses) are calculated as follows:

$$\text{Eastbound:} [L_{pe}\alpha_p + Y_{pe}\alpha_p + Y_{ne}\alpha_n + (2S_p + S_{n/p} + 2S_{n/L} + 2S_{p/L} + B_{p/n}) + R_{pe}\alpha_p + R_{ne}\alpha_n] \, dB \quad \text{Eq. 12}$$

$$\text{Westbound:} [L_{nw}\alpha_n + Y_{nw}\alpha_n + Y_{pw}\alpha_p + (S_n + S_p + S_{n/p} + 3S_{p/L} - B_{n/p} + S_{n/L}) + R_{pw}\alpha_p] \, dB \quad \text{Eq. 13}$$

For this repair scenario, the loss calculation accounts for a factory bridged N-P splice, which is removed in the Westbound direction.

For an all-P repair (see FIG. 13), the losses of the repaired cable section (ignoring the LBO losses) are calculated as follows:

$$\text{Eastbound:} [L_{pe}\alpha_p + Y_{pe}\alpha_p + Y_{ne}\alpha_n + (2S_p + S_{n/p} + 2S_{n/L} + S_{p/L} + B_{n/p}) + R_{pe}\alpha_p + R_{ne}\alpha_n] \, dB \quad \text{Eq. 14}$$

$$\text{Westbound: } [L_{nw}\alpha_n + L_{pw}\alpha_p + Y_{nw}\alpha_n + Y_{pw}\alpha_p + (B_{n/p} + 2S_{n/p} + 2S_p + 3S_{p/L} + S_{n/L}) + R_{pw}\alpha_p] \, dB \quad \text{Eq. 15}$$

These equations are slightly different than the comparable ones of hybrid and all-N/P repair because some of the splice losses at the interface between the original and replacement portions are different.

When the entire original P-portion is removed during the repair (see FIG. 14), the losses of the repaired cable section (ignoring the LBO losses) are calculated as follows:

Eastbound: $[L_{pe}\alpha_p + Y_{pe}\alpha_p + Y_{ne}\alpha_n + (2S_p + S_{n/p} + 3S_{n/L} + S_{p/L}) + R_{ne}\alpha_n]$ dB  Eq. 16

Westbound: $[L_{nw}\alpha_n + Y_{nw}\alpha_n + Y_{pw}\alpha_p + (S_n + S_p + S_{n/p} + 3S_{p/L} + S_{n/L}) + R_{pw}\alpha_p]$ dB  Eq. 17

Figure 16:
FIGS. 16–18 illustrate repair scenarios of cable removal in a compensation cable section.
Figure 17:
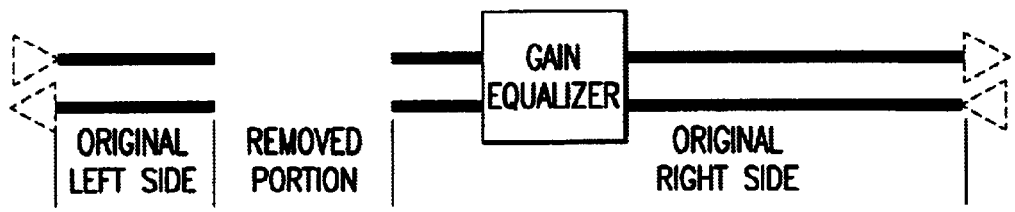
Figure 18:

Referring to FIGS. 16–18, the three scenarios that can occur in an all compensation section repair are as follows: (1) no gain equalizer in the section (FIG. 16); (2) a gain equalizer in the section but not recovered during the repair (FIG. 17); and (3) a gain equalizer in the section and recovered during the repair (FIG. 18). The gain equalizers are possibly accompanied by LBOs in an adjacent splice box.

Figure 19:
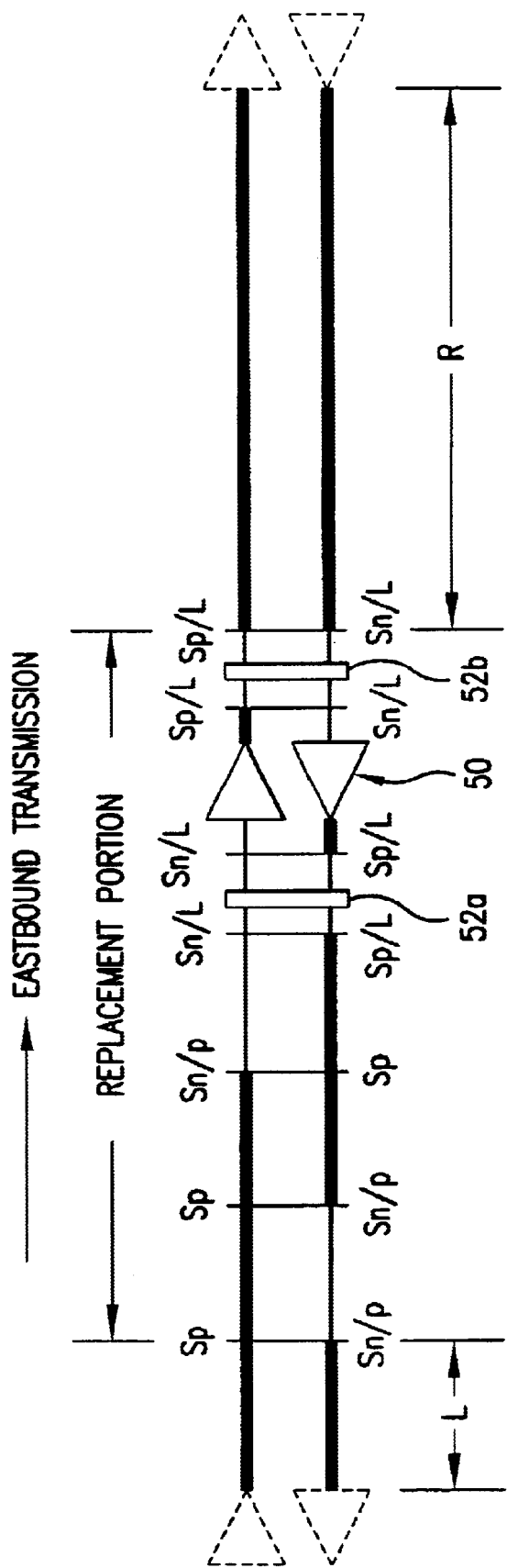
FIG. 19 is a schematic diagram of one embodiment of a repaired compensation cable section without gain equalizers.

FIG. 19 shows a completed compensation cable section repair including the splices associated with the repair repeater LBOs in the splice boxes 52a, 52b when the faulted section contains no gain equalizer. The repaired section losses are calculated as follows:

Eastbound: $[L_{pe}\alpha_p + Y_{pe}\alpha_p + Y_{ne}\alpha_n + 2S_p + S_{n/p} + 2S_{n/L} + 2S_{p/L} + R_{pe}\alpha_p]$ dB  Eq. 18

Westbound: $[L_{nw}\alpha_n + Y_{nw}\alpha_n + Y_{pw}\alpha_p + (2S_{n/p} + S_p + 3S_{p/L} + S_{n/L}) + R_{pw}\alpha_p]$ dB  Eq. 19

Although this example does not include a gain equalizer installed in the original section, it is possible that a large value of LBO (e.g., greater than 4 dB) is near the middle of an otherwise all-P compensation cable section. If this LBO is recovered during the repair, it is possible that a repair repeater will not be needed. According to one method of repair, such an LBO may be recovered, even if not otherwise necessary, to obviate the need for a repair repeater. When the calculated LBO values for each direction of transmission are within a dB of the nominal repeater gain (equal to the nominal section design loss), then no repeater or LBO is needed.

In a repaired compensation cable section containing a gain equalizer that is not recovered, the difference from the no-gain-equalizer case above is that the effective flat loss of the equalizer (possibly accompanied by an LBO in an adjacent splice box) needs to be added to the Right-hand portion of the original section. In the equations below, the equalizer loss is represented by E dB, which includes as well as the gain equalizer loss, any additional factory-installed LBOs in a splice box adjacent to the equalizer. The repaired cable section losses are calculated as follows:

Eastbound: $[L_{pe}\alpha_p + Y_{pe}\alpha_p + Y_{ne}\alpha_n + (2S_p + S_{n/p} + 2S_{n/L} + 2S_{p/L}) + R_{pe}\alpha_p + E]$ dB  Eq. 20

Westbound: $[L_{nw}\alpha_n + Y_{nw}\alpha_n + Y_{pw}\alpha_p + (2S_{n/p} + S_p + 3S_{p/L} + S_{n/L}) + R_{pw}\alpha_p + E]$ dB  Eq. 21

Figure 20:
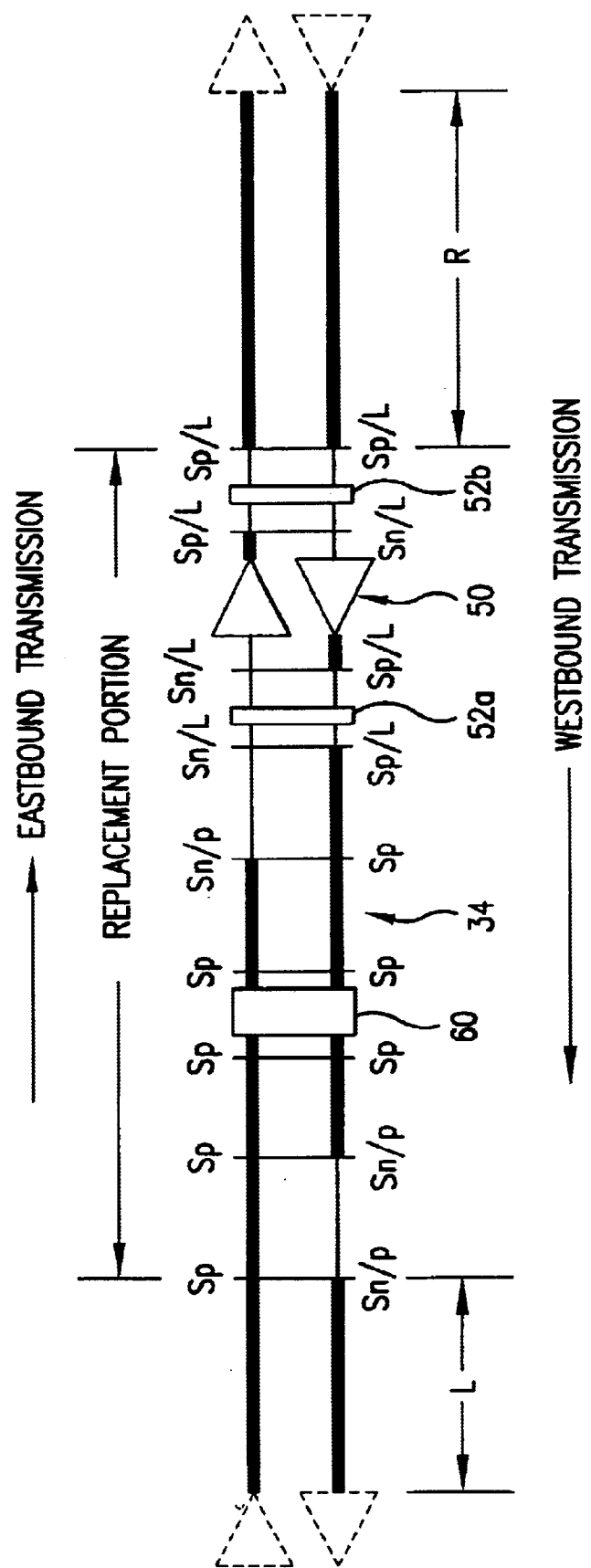
FIG. 20 is a schematic diagram of another embodiment of a repaired compensation cable section containing a gain equalizer.

FIG. 20 shows a completed compensation cable section repair when the gain equalizer is recovered and replaced including the splices associated with insertion of repair repeater LBOs. If a gain equalizer is recovered in the faulted cable, the replacement cable portion of the repair includes a replacement equalizer unit 60 for the removed equalizer. The replacement equalizer unit 60 can either be a spare unit, or the recovered unit (but without any accompanying adjacent LBO provided it is still serviceable. To minimize splice loss, the replacement equalizer unit 60 should be joined into the system in the all-P length 34 of the replacement cable portion. In this repair, seven splice boxes are used to complete the repair (instead of the usual five). The repaired section losses are calculated as follows Eastbound: $[L_{pe}\alpha_p + Y_{pe}\alpha_p + Y_{ne}\alpha_n + E + (4S_p + S_{n/p} + 2S_{n/L} + 2S_{p/L}) + R_{pe}\alpha_p]$ dB  Eq. 22

Westbound: $[L_{nw}\alpha_n + Y_{nw}\alpha_n + Y_{pw}\alpha_p + (2S_{n/p} + 3S_p + 3S_{p/L} + S_{n/L}) + E + R_{pw}\alpha_p]$ dB  Eq. 23

The actual calculation of LBO values can be more complex in some cases, and the above equations may be modified accordingly. For example, there is additional splice loss at each end of an LBO (e.g., $S_{p/L}$) when the LBO is inserted and this was accounted for by including these splice losses (e.g., 2 $S_{p/L}$) in the loss equations presented earlier, Equations 8 and 9, and Equations 12 through 23. However, if no LBO value is called for on one side of the repair repeater, then the loss normally provided by the two LBO end splices (e.g., 2 $S_{p/L}$) is no longer there either; rather there is the direct cable-to-cable splice at the repair repeater tail. In this situation, the value of the LBO on the other side of the repair repeater preferably accounts for the splice loss differences that result. According to another variation of the calculation, the LBO loss can be set to zero if the calculation of LBO loss using Equations 10 or 11 is less than the end splices losses corresponding to LBO insertion.

Based upon the suspected location of the fault, the location of the initial cable cut is chosen similar to current undersea cable system repair practice. In the preferred method, the cable is recovered on what is expected to be the Left side of the cut to avoid having a repair repeater in the final bight. The cable can also be recovered on the Right side, depending upon the circumstances. The cable is then tested to determine if the cable is fault free. If not, additional cable is recovered until the fault is found and cleared. The end of this remaining cable section is then buoyed off.

The other cable end is then recovered and the recovered cable is tested to determine if the cable is fault free. If not, additional cable can be recovered until the fault is found and cleared. Depending upon how much cable is recovered from each side of the cut, the initial designations of Left and Right might need to be reversed to be sure that the Left side is the one with lower loss.

At this point, the length of the original cable removed, the lengths of the original cable remaining on the Left and Right sides, and the depth of water at the repair site are determinable. If necessary, optical time domain reflectometry (OTDR) readings can be used to determine these lengths. An OTDR is able to identify the locations where N and P fibers are spliced together. Based upon these values, the amount of extra cable needed for the repair is determined (e.g., about 2.5 times the water depth).

The lengths of the three pieces of spare cable making up the replacement cable portion are calculated, for example, using Equations 4–7. When a repair repeater is going to be used, the ideal LBO values for the Left and Right sides of the repair repeater are also calculated, for example, using Equations 8–23. Based upon the calculated ideal LBO values, the LBOs are selected from the available LBOs.

The replacement cable portion is then constructed by connecting the N-P spare cable lengths 32a, 32b to the P spare cable length 34 using the splice boxes 36a, 36b. If needed, the repair reapeater 50 is connected at the Right end of the replacement cable portion using the splice box 52 a (see FIG. 10). If the repair is in an all-P compensation section containing a gain equalizer that was recovered, the replacement gain equalizer 60 is located in the all-P cable length of the replacement cable portion (see FIG. 20). The replacement cable portion is then joined to the Right side end of the remaining original cable section using a splice box. The replacement cable portion is laid back to the buoy and the final joint is made to the Left side of the remaining original cable section using a splice box.

According to another variation of the method, where the final joint will be in N-P cable of a regular cable section, the N-P spare cable length 32a, which will be connected at the final joint, is preferably made longer than the length calculated for zero net dispersion change. If the recovery of the Left side of the remaining original cable section goes as planned, the extra length of the N-P spare cable length 32a can be removed before the final joint is made. However, if more of the remaining original cable has to be removed (e.g., if the buoy were lost or the cables were damaged during recovery), the extra long N-P spare cable can be trimmed appropriately to provide the calculated length and additionally to replace the amount of remaining original N-P cable that was lost during recovery.

The repair method of the present invention can also be used to repair a slope-matched cable system in which a fault occurs in a repeater connected to the cable. In this type of repair, a replacement repeater is used to replace the faulty repeater that was recovered. The replacement repeater can be connected to one end of the replacement cable portion in a manner similar to the connection of the repair repeater, as described above.

Figure 21:
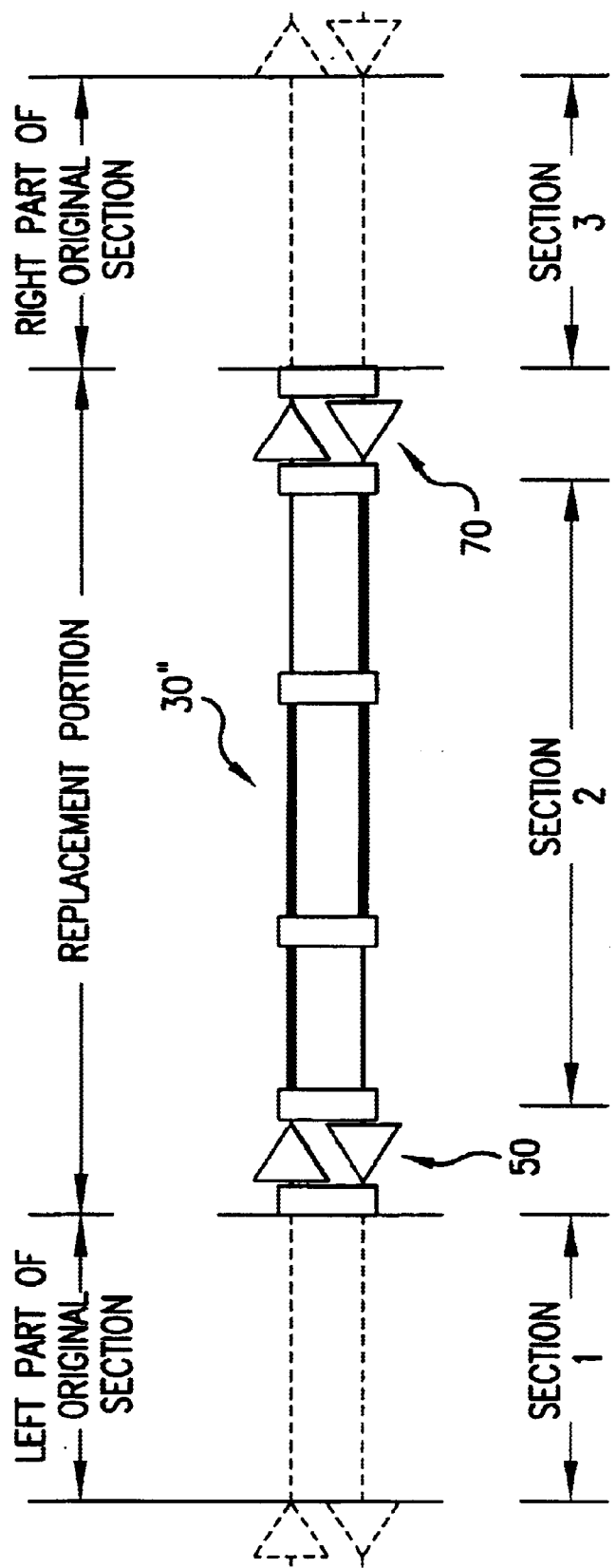
FIG. 21 is a schematic diagram of a replacement cable portion containing a replacement repeater and a repair repeater, according to a further embodiment of the present invention.

In one embodiment of the replacement cable portion 30", as shown in FIG. 21, the repair reapeater 50 is placed at one end and the replacement repeater 70 is placed at the other end of the replacement cable portion 30. The replacement cable portion can also include a replacement repeater without a repair repeater. In the preferred embodiment, the repair reapeater 50 is connected to the Left part of the original section in which the loss is less than that on the Right part of the original section. LBO values are preferably chosen to maintain the loss of cable section 1 and cable section 3 generally as they were before the repair, and the loss of the cable section 2 generally equal to the nominal design value of cable section loss, thus insuring that the end-to-end gain shape of the system transmission spectrum will remain nominally unchanged by the repair. In some cases where one or more of the calculated LBO loss values is negative, the total loss of the three sections, for each fiber path, is preferably generally equal to the ideal total loss of the three sections. The equations for calculating ideal LBO values according to one method are described in greater detail below.

Figure 22:
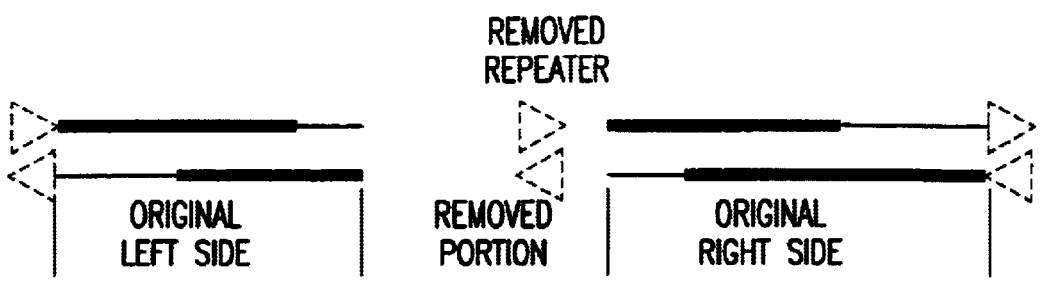
FIGS. 22–25 illustrate repeater-replacement repair scenarios.
Figure 23:
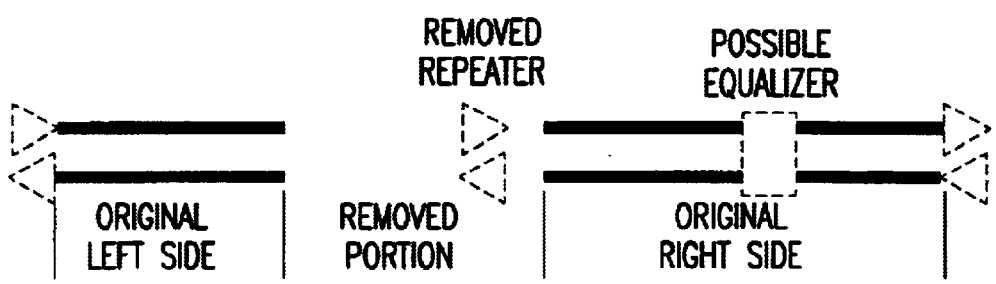
Figure 24:
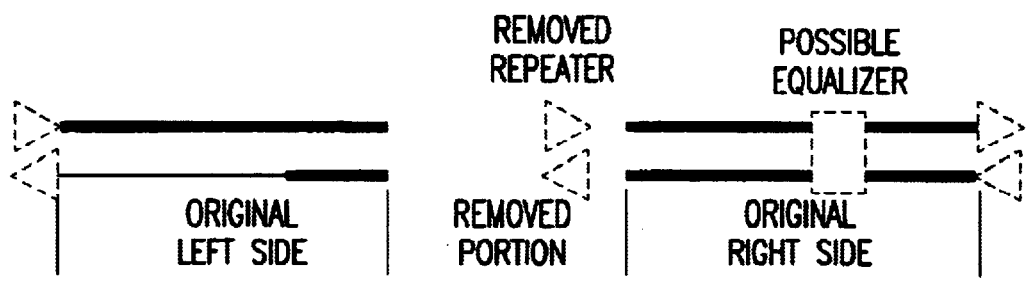
Figure 25:
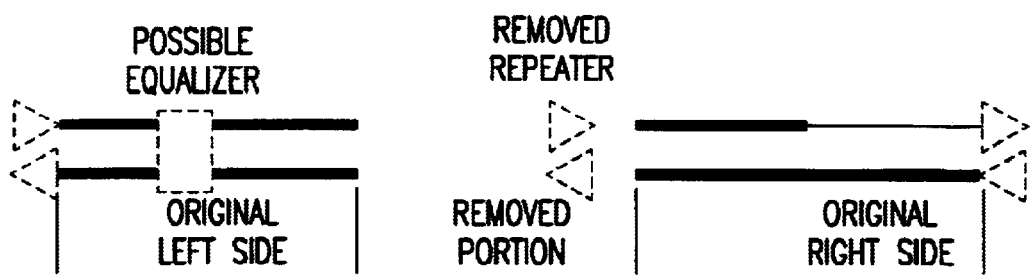

When repairing a cable system having a faulty repeater, the equations for calculating ideal LBO values depend upon the repair scenario. With the repair discussed above, separate equations are derived for the two directions of transmission, left to right ("eastbound") and right to left ("westbound"), because splice loss values are fiber-type dependent. Four repeater-replacement repair scenarios are considered depending upon what type of cable section is on either side of the repeater to be removed. Referring to FIGS. 22–25, the four repeater-replacement repair scenarios are as follows: (1) removed repeater located between two regular cable sections (FIG. 22); (2) removed repeater located between two compensation cable sections (FIG. 23); (3) removed repeater with regular section on left and compensating section on right (FIG. 24); and (4) removed repeater with compensation cable section on left and regular cable section on right (FIG. 25). The loss calculations described below are based on the assumption that the only cable type removed from a regular section is N-P cable and the assumption that it is not necessary to recover an equalizer in a compensation section. However, this is not considered to be a limitation of the present invention.

Figure 26:
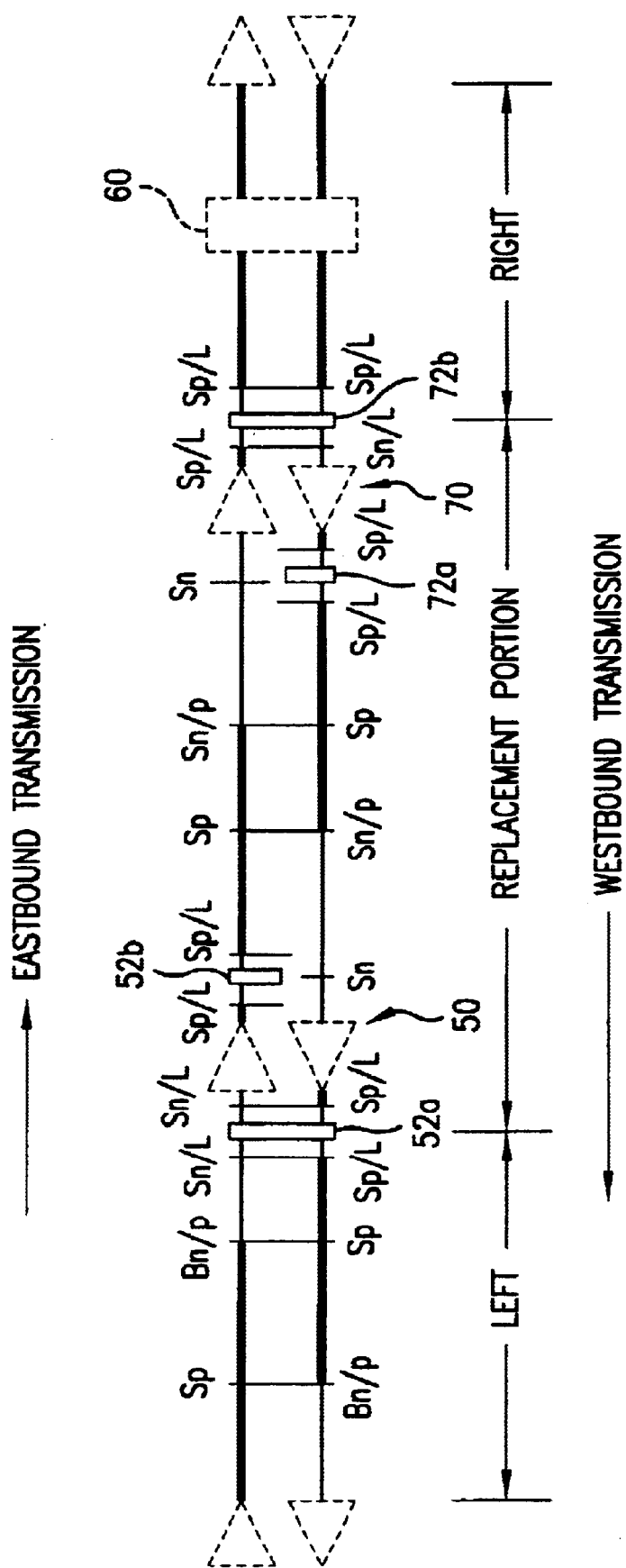
FIG. 26 is a schematic diagram of one embodiment of a repaired cable system including both a replacement repeater and a repair repeater.

Referring to FIG. 26, the calculation of losses and ideal LBO values for scenario three is described in greater detail. FIG. 26 shows a completed repeater-replacement repair including the splices associated with insertion of LBOs in the replacement portion associated with the replacement repeater 70 and the repair reapeater 50 and including known splice losses in the remaining original Left portion. Fiber splice losses (in dB) are defined above.

Assuming no LBO losses (but including the two splice losses need to install an LBO), the repair section losses are calculated as follows:

Eastbound: $[L_{pe}\alpha_p + L_{ne}\alpha_n + Y_{pe}\alpha_p + Y_{ne}\alpha_n + (2S_p + B_{n/p} + S_{n/p} + 2S_{n/L} + 4S_{p/L} + S_n) + R_{pe}\alpha_p + E_R]$ db  Eq. 24

Westbound: $[L_{nw}\alpha_n + L_{pw}\alpha_p + Y_{nw}\alpha_n + Y_{pw}\alpha_p + (B_{n/p} + S_n + S_{n/p} + 2S_p + 5S_{p/L}S_{n/L}) + R_{pw}\alpha_p + E_R]$ dB  Eq. 25

Where $\alpha_p$ and an are the attenuation of P and N fibers in dB/km; $E_R$ represents the equivalent flat loss of an equalizer (GEJ or SCU), or a mid-section LBO, if any one of these were located in the compensation section; and $L_{pe}$, $L_{ne}$, $L_{nw}$, $L_{pw}$, $R_{pe}$ and $R_{pw}$ are the lengths (km) of the Left-Eastbound-P, Left-Eastbound-N, Left-Westbound-N, Left-Westbound-P, Right-Eastbound-P, and Right-Westbound-P fiber paths respectively.

For a repair in scenario two where the replaced repeater has a compensation section on each side (see FIG. 23), the post-repair losses for the three new sections (ignoring LBO losses) can be calculated as follows:

Eastbound: $[L_{pe}\alpha_p + E_L + Y_{pe}\alpha_p + Y_{ne}\alpha_n + (S_p + S_{n/p} + S_{n/L}5S_{p/L}) + R_{pe}\alpha_p + E_R]$ dB  Eq. 26

Westbound: $[L_{pw}\alpha_p + E_L + Y_{nw}\alpha_n Y_{pw}\alpha_p + (S_p + S_{n/p}S_{n/L}5S_{p/l}) + R_{pw}\alpha_p + E_R]$ dB  Eq. 27

Where $E_L$ and $E_R$ account for the equivalent flat loss of an equalizer or a mid-section LBO on the Left or Right, respectively, if any one of these were located in either compensation section.

For scenario one where the replaced repeater has a regular cable section on each side (see FIG. 22), the post-repair losses for the three new sections (ignoring the LBO losses) are calculated as follows:

Eastbound $[L_{pe}\alpha_p L_{ne}\alpha_n + Y_{pe}\alpha_p + Y_{ne}\alpha_n + (3S_p 30\ S_{n/p} + 2S_{n/L} + 4S_{p/L} + 2B_{n/p} + S_n) + R_{pe}\alpha_p + R_{ne}\alpha_n]$ dB  Eq. 28

Westbound $[L_{nw}\alpha_n + L_{pw}\alpha_p + Y_{nw}\alpha_n + Y_{pw}\alpha_p + (3S_p 30\ S_{n/p} + 4S_{p/L} + 2S_{n/L} + 2B_{n/p} + S_n) + R_{pw}\alpha_p + R_{nw}\alpha_n]$ dB  Eq. 29

For scenario four where the removed repeater has a compensation section on the Left and a regular section on the Right (see FIG. 25), the post-repair losses for the three sections (ignoring the LBO losses) are calculated as follows:

Eastbound: $[L_{pe}\alpha_p + E_L + Y_{pe}\alpha_p + Y_{ne}\alpha_n + (S_{n/p} + 2S_p + S_{n/L}5S_{p/L}S_n B_{n/p}) + R_{pe}\alpha_p + R_{ne}\alpha_n]$ dB  Eq. 30

Westbound: $[L_{pw}\alpha_p + E_L + Y_{nw}\alpha_n + Y_{pw}\alpha_p + (2S_p + S_{n/p} + S_n 4S_{p/L} + 2S_{n/L} + B_{n/p}) + R_{pw}\alpha_p + R_{nw}\alpha_n]$ dB  Eq. 31

In the exemplary embodiment, there are three LBO values to be determined for each of the two added repeaters. The LBO values are preferably chosen to keep the net loss of each path in the three new cable sections equal to the nominal cable section loss. For compensation sections, however, it is preferable to build out these sections to their original section loss values because of the equalization functions provided by the compensation sections. Where the calculation results in a negative LBO value, the LBO can be set to zero and another LBO value in the same path and direction can be readjusted such that the net loss for the three new cable sections is the sum of the desired losses for the three sections. If an LBO value is zero and no LBO is inserted, the removal of the splice losses accompanying the insertion of the LBO and the addition of the one direct splice is preferably accounted for in determining the correct LBO values. The above equations and calculations are exemplary for one embodiment of the present invention and other equations and calculations can be used to implement the present invention.

In the method of repairing a cable system having a faulty repeater, the lengths of spare cable used in the replacement cable portion are generally calculated in the same manner as repairing a cable system with a faulty cable, as described above. Also, the steps of cutting the original cable and connecting the replacement cable portion are generally the same as the repair method described above.

In summary, the method of repairing a slope-matched cable system, according to the present invention, allows the net end-to-end system dispersion following the repair to remain nominally unchanged in both transmission directions, even when a repair is made in a compensation cable section, and establishes losses in the newly created cable sections such that the end-to-end gain shape of the transmission spectrum of the system in nominally unchanged.

Modifications and substitutions by one of ordinary skill in the art are considered to be within the scope of the present invention, which is not to be limited except by the following claims.

The invention claimed is:

1. A method of repairing a slope-matched cable system including at least one N-type fiber having a negative dispersion rate and at least one P-type fiber having a positive dispersion rate, said method comprising the steps of:
  removing a faulted portion of said slope-matched cable system;
  providing first and second N-P cable lengths from spare N-P cable including at least one N-type fiber and at least one P-type fiber;
  providing at least one all-P cable length from spare P cable including at least first and second P-type fibers;
  constructing a replacement cable portion from said N-P cable lengths and said P cable length, wherein said N-P cable lengths are connected to each side of said P cable length; and
  connecting said replacement cable portion between ends of said slope-matched cable system where the faulted portion was removed.

2. The method of claim 1 wherein said faulted portion includes a faulty cable portion.

3. The method of claim 1 wherein said faulted portion includes a faulty repeater, and further comprising connecting a replacement repeater to one end of said replacement cable portion.

4. The method of claim 1 wherein said N-P cable lengths are connected to each side of said P cable length by splicing said fibers.

5. The method of claim 1 wherein the step of providing said first and second N-P cable lengths and said P cable length includes the step of calculating lengths of said spare N-P cable and said P cable.

6. The method of claim 5 wherein said lengths of said spare N-P cable and said spare P cable are calculated based on dispersion rates of said N-type fiber and said P-type fiber.

7. The method of claim 1 wherein said N-P cable lengths include half N-type fibers and half P-type fibers, and wherein said P cable length includes all-P-type fibers.

8. The method of claim 7 wherein the step of constructing said replacement cable portion includes the steps of:
  splicing said N-type fibers in said first N-P cable length to a first half of said P-type fibers in said P cable length;
  splicing said N-type fibers in said second N-P cable length to said first half of said first P-type fiber in said P cable length;
  splicing said P-type fibers in said first N-P cable length to a second half of said P-type fibers in said P cable length; and
  splicing said P-type fibers in said second N-P cable length to said second half of said P-type fibers in said P cable length.

9. The method of claim 8 wherein said N-P cable lengths are connected to said P cable length and splices are made using splice boxes.

10. The method of claim 1 further comprising the step of connecting a repair repeater to one end of said replacement cable portion.

11. The method of claim 10 further comprising the step of connecting splice boxes on each side of said repair repeater.

12. The method of claim 11 wherein said splice boxes include loss buildouts.

13. The method of claim 12 further comprising the step of calculating loss buildout values.

14. The method of claim 13 wherein said loss buildout values are calculated such that end-to-end gain shape of the transmission spectrum of the system is nominally unchanged by the repair.

15. The method of claim 1 further comprising the step of connecting a gain equalizer to said replacement cable portion.

16. The method of claim 15 wherein said at least one all-P cable length includes two all-P parts and said gain equalizer is connected between said two all-P parts.

17. The method of claim 3 further comprising the step of connecting a repair repeater to another end of said replacement cable portion.

18. A replacement cable portion for use in a slope-matched cable system, said replacement cable portion comprising:
  first and second N-P cable lengths including half N-type fibers and half P-type fibers, wherein said N-type fibers have a negative dispersion rate and said P-type fibers have a positive dispersion rate;
  at least one P cable length including all-P-type fibers;
  a first splice box connecting said first N-P cable length and said P cable length, wherein said N-type fibers in said first N-P cable length are spliced to a first half of said P-type fibers in said P cable length, and wherein said P-type fibers in said first N-P cable length are spliced to a second half of said P-type fibers in said P cable length;
  a second splice box connecting said first N-P cable length and said P cable length, wherein said N-type fibers in said first N-P cable length are spliced to said first half of said P-type fibers in said P cable length, and wherein said P-type fibers in said first N-P cable length are spliced to said second half of said P-type fibers in said P cable length; and wherein said first and second N-P cable lengths and said P cable length are selected such that a net dispersion in said slope-matched cable system remains nominally unchanged when repaired with said replacement cable portion.

19. The replacement cable portion of claim 18 wherein lengths of said N-P cable lengths and said P cable length are calculated based on dispersion rates of said N-type fiber and said P-type fibers.

20. The replacement cable portion of claim 18 further comprising a repair repeater coupled to one of said N-P cable lengths.

21. The replacement cable portion of claim 20 further comprising splice boxes coupled to said repair repeater on each side of said repair repeater.

22. The replacement cable portion of claim 21 wherein said splice boxes coupled to said repair repeater include loss buildouts.

23. The replacement cable portion of claim 22 wherein said loss buildouts have values such that an end-to-end gain shape of a transmission spectrum of the system is nominally unchanged by the repair.

24. The replacement cable portion of claim 18 further comprising a gain equalizer coupled to said at least one P cable length.

25. The replacement cable portion of claim 24 wherein said at least one P cable length includes two P parts, and said gain equalizer is coupled between said P parts.

26. The replacement cable portion of claim 18 further comprising a replacement repeater coupled to one of said N-P cable lengths.

27. The replacement cable portion of claim 20 further comprising a replacement repeater coupled to the other of said N-P cable lengths.

28. A method of constructing a replacement cable portion, for use in repairing a slope-matched cable system comprising the steps of:

connecting first and second N-P cable lengths to each side of a P cable length, wherein said N-P cable lengths include half N-type fibers having a negative dispersion rate and half P-type fibers having a positive dispersion rate, and wherein said P cable length includes all P-type fibers, wherein said first and second N-P cable lengths and said P cable length are selected such that a net dispersion in said slope-matched cable system remains nominally unchanged when repaired with said replacement cable portion; and connecting a repeater to one of said N-P cable lengths.

29. The method of claim 28 wherein said repeater is selected such that an end-to-end gain shape of a transmission spectrum of the system is nominally unchanged by the repair.

* * * * *